(12) United States Patent
Domazakis

(10) Patent No.: US 7,026,007 B2
(45) Date of Patent: Apr. 11, 2006

(54) METHOD OF PRODUCTION OF A MEAT PRODUCT CONTAINING OLIVE OIL

(75) Inventor: Emmanouil Domazakis, Rethymnon (GR)

(73) Assignee: Creta Farm Anonimos Viomichaniki & Emporiki Etaireia, Rethymnon (GR)

( * ) Notice: Subject to any disclaimer, the term of this patent is extended or adjusted under 35 U.S.C. 154(b) by 147 days.

(21) Appl. No.: 10/031,089

(22) PCT Filed: May 29, 2001

(86) PCT No.: PCT/GR01/00025

§ 371 (c)(1),
(2), (4) Date: Jan. 15, 2002

(87) PCT Pub. No.: WO02/065860

PCT Pub. Date: Aug. 29, 2002

(65) Prior Publication Data

US 2003/0049364 A1 Mar. 13, 2003

(30) Foreign Application Priority Data

Feb. 19, 2001 (GR) .............................. 20010100089

(51) Int. Cl.
*A23L 1/314* (2006.01)
*A23L 1/317* (2006.01)

(52) U.S. Cl. ...................... 426/646; 426/412; 426/804

(58) Field of Classification Search ................ 426/412, 426/646, 804
See application file for complete search history.

(56) References Cited

U.S. PATENT DOCUMENTS 3,482,998 A * 12/1969 Carroll et al. .............. 426/646
5,238,701 A    8/1993 Dubanchet
5,654,028 A * 8/1997 Christensen et al. .... 426/646 X
6,419,977 B1 * 7/2002 Born .......................... 426/646

OTHER PUBLICATIONS

Kanavouras, Antonia et al., "Evolution of Thermographic Parameters During the Oxidation of Extra Virgin Olive Oil," Eur.J. Lipid Sci. Technol. 106 (2004) pp. 359-368, month unavailable.
Van Den Hoven et al., *Functionality of dairy ingredients in meat products*, Food Technology, US, Institute of Food Technologists, Chicago, Oct. 1, 1987, vol. 41, No. 10, pp. 72-73, 76-77, 103.

* cited by examiner

*Primary Examiner*—Arthur L. Corbin
(74) *Attorney, Agent, or Firm*—Clifford W. Browning; Woodard, Emhardt, Moriarty, McNett & Henry LLP

(57) ABSTRACT

Method of pork meat products production (cooked—sausages—salamis of comminuted meat) with direct incorporation of olive oil and maximum possible animal fat substitution, which includes the following phases:

a. Mixing of lean pork meat with water, salt, polyphosphates, preservatives, vegetable proteins, milk proteins and starch; b. Addition of olive oil and mixing; c. the mixture is encased with simultaneous application of vacuum and is pasteurized; d. cooling of the product.

Products based on meat with incorporation of olive oil, which are produced according to this method, have an excellent stability as far as structure is concerned (compactness) and the sensory characteristics of olive oil which these products contain remain unchangeable.

2 Claims, No Drawings

METHOD OF PRODUCTION OF A MEAT PRODUCT CONTAINING OLIVE OIL

The present invention involves the production of meat products with:
a. the direct incorporation of olive oil in replacement of animal fat
b. the use of lean pork meat
c. the addition of processing aids
d. the appropriate processing technology to:
   obtain a stable emulsion type meat product incorporating pure virgin olive oil, able to undergo thermal processing without phenomena of oil extrusion;
   obtain a product which retains the original nutritional and sensory properties of olive oil.

BACKGROUND OF THE INVENTION

Comminuted sausages are considered an emulsion type of product in which meat protein, fat and water construct a stable matrix.

Emulsion stability is a function, among other variables, of the water and fat holding capacity of the meat used.

Especially meat proteins, and more specific the salt soluble fraction (actin, myosin and their complex) which represent approximately 60% of total protein content contribute, to the emulsion stability, as in their hydrated state they function as a protective frame of the incorporated fat, which comprises the non-continuous phase of the emulsion and the main factor of product destabilization.

SUMMARY OF THE INVENTION

The obtainment of a stabilized embodiment of the olive oil (oil globules) in the "emulsion" constitutes a technological target of this invention, which is dealt with known combined techniques, such as selection and preparation of meat, pH regulation of the meat, the quantity of added salt, the use of processing aids, the process conditions of meat paste creation, thermal processing and cooling of the final product, etc.

Nevertheless, the incorporation of olive oil, in comparison to the traditional addition of pork fat, as long as it is tested with classic techniques, runs into difficulties of instability or presents tendencies of instability, not only of the meat-paste but of the final product as well, that usually appear oily.

Consolidated well-known techniques of indirect embodiment of vegetable oils are known, which:
include a procedure of preliminary thermal processing of olive oil at temperatures over 100° C. twice.

This is especially so in the case of olive oil, whose role in nutrition of humans is distinctive among vegetable oils, and also internationally renowned for its beneficial features (reference to omega fatty acids and their protective role, low cholesterol content, tocopheroles and polyphenols with the later two acting as antioxidants).

Therefore, it is thought to be essential,
on one hand, that its participation as an ingredient substituting animal fat in thermally processed pork meats products, to be achieved under especially protective conditions, so that maximal protection of its characteristics is secured in the product;
on the other hand, that the process of incorporation ensures the traditional technique of thermally processed pork meat products, and that scientific facts will systematically be taken into consideration based on the characteristics of protein, fat and oil as well as the potential of their in-between connection depended on these characteristics.

The fact that the stability of so called meat emulsions is affected by the following parameters, must also be taken into account:
the source and the composition of the incorporated fat; and
its chemical and sensory characteristics, including:
   fatty acid profile (kind and degree of saturation)
   the Solid Fat Index (SFI)
   the relation of poly-unsaturated fatty acids (PUFA), mono-unsaturated fatty acids (MUFA) and saturated fatty acids (SUFA).

It is obvious that from technological aspect the differences between pork fat and olive oil should be taken into consideration when creating a stable emulsion.

In the critical production temperatures (0–4° C. to 71° C.) as well as in the temperature range during cooling and during storage (3–7° C.), the SFI plays a very significant role. In the case of olive oil, its characteristics presuppose incorporation under specific conditions consisting of:
   the creation of the maximum possible incorporation of oil through mechanical process (mixing, homogenization of the participating ingredients);
   the estimation of the ideal relation between these ingredients so that the maximum possible soaking and oil retention by the emulsion is combined at the same time with maximal water content absorption by protein; and
   the creation of a stable "waterproof" protein complex surrounding the fat globules without application of high temperatures for protein transformation, with the application of mechanical process under selected conditions In the end, one significant aim is the insurance of stable behavior of the meta-paste "emulsion" during the phases of thermal processing, cooling and cutting and packaging, of the product and during the maintenance under low temperature conditions.

The aim of the present invention is the production of goods based on thermally processed meat (cooked products of pork meat—sausages—salamis):
   with direct "cold" incorporation of olive oil and maximum possible substitution of animal fat;
   with the addition of combined processing aids;
   the application of a special technological process.

DETAILED DESCRIPTION OF THE PREFERRED INCORPORATION

This aim is achieved by mixing—low fat (lean) meat in "cool" with olive oil in combination with the use of vegetable protein, milk protein, polyphosphates, water and salt.

In this way, the present invention offers pork meat products with olive oil and a method for their production with in cold mixing of olive oil, lean meat and water.

Thin chopped lean meat at a temperature of 0° C. is mixed with water at −2° C. in a mixing machine with simultaneous addition of salt. Next, are inserted polyphosphates, preservatives and spices. After all these are mixed, gradually vegetable protein, milk protein and starch are added. When the temperature of the mix reaches 2° C. the olive oil is inserted. Mixing continues with simultaneous application of a vacuum of 960 mbar for 3 min in order to remove oxygen and prevent oxidation, until temperature reaches 4° C. The entire mixing time is 15 min and the absorbing power 26 KW. The mixture then goes to a filling machine where is encased with simultaneous application of a 1000 mbar vacuum with absorbing power of 7 KW, and later on is pasteurized to 71° C. The entire time of the thermal process depends on the product diameter and ranges from 1 to 3 hours. Following pasteurization, the product is cooled in chilling chambers of temperatures ranging from −2° C. to +2° C.

Pork meat products with olive oil that are produced according to this invention, have excellent stability as far as structure is concerned (compactness) due to the use of lean meat, application of low temperatures and production under vacuum. The sensory characteristics of olive oil, incorporated in these products, remain unchangeable, because of the low temperature used during the production process.

The invention claimed is:

1. Method for producing meat products including olive oil in substitution of animal fat, comprising the following steps:
   (a) providing lean meat at a temperature of 0° C. and mixing the lean meat with water at a temperature of −2° C., salt, polyphosphates, preservatives, vegetable proteins, milk proteins and starch until the resulting mixture reaches a temperature of 2° C.;
   (b) mixing the resulting mixture at a temperature of 2° C. with olive oil and continuing mixing with a simultaneous application of a vacuum until the resulting product mixture reaches a temperature of 4° C.;
   (c) transferring the resulting product mixture to filling machines, encasing the resulting product mixture and applying a simultaneous vacuum, and then pasteurizing the encased resulting product mixture to a core temperature of 71° C.; and
   (d) cooling the encased resulting product mixture in cooling chambers at a temperature of up to 2° C.

2. The method of claim 1 wherein the total time of the steps of the method depends on the diameter of the final product mixture and ranges from 1 to 3 hours.

* * * * *